(12) United States Patent
Fargason, III

(10) Patent No.: US 7,311,355 B2
(45) Date of Patent: Dec. 25, 2007

(54) TENT CHAIR

(76) Inventor: William H. Fargason, III, 1423 Highway 1, Bessemer, AL (US) 35022

( * ) Notice: Subject to any disclaimer, the term of this patent is extended or adjusted under 35 U.S.C. 154(b) by 165 days.

(21) Appl. No.: 11/079,075

(22) Filed: Mar. 15, 2005

(65) Prior Publication Data
US 2006/0220424 A1    Oct. 5, 2006

(51) Int. Cl.
A47C 7/62    (2006.01)
(52) U.S. Cl. ............... 297/184.15; 297/184.17; 297/184.1; 135/133
(58) Field of Classification Search ......... 297/184.1, 297/184.11, 184.12, 184.14, 184.15, 184.17; D6/491; 135/96, 128, 132, 133, 143, 125, 135/126, 137
See application file for complete search history.

(56) References Cited

U.S. PATENT DOCUMENTS

| | | | | |
|---|---|---|---|---|
| 2,137,427 A | * | 11/1938 | Campbell | 297/23 |
| 2,166,832 A | * | 7/1939 | Wenker | 297/184.15 |
| 2,811,977 A | | 11/1957 | McClish | |
| 3,027,189 A | * | 3/1962 | Scott | 297/184.14 |
| 3,131,704 A | * | 5/1964 | Shimon | 297/184.14 |
| 3,509,891 A | * | 5/1970 | De Bolt | 135/148 |
| 3,799,608 A | * | 3/1974 | Smutny et al. | 297/184.14 |
| 4,083,601 A | | 4/1978 | McBeth | |
| 4,106,145 A | * | 8/1978 | Gillen et al. | 114/351 |
| 4,533,170 A | | 8/1985 | Banks et al. | |
| 4,788,997 A | * | 12/1988 | Clopton | 135/117 |
| 4,915,120 A | | 4/1990 | Ziolkowski | |
| 4,971,089 A | * | 11/1990 | Braman | 135/90 |
| 5,171,059 A | | 12/1992 | Patrick | |
| 5,320,405 A | * | 6/1994 | Foster et al. | 297/184.17 |
| D353,678 S | | 12/1994 | Diaz | |
| D378,540 S | | 3/1997 | Becker | |
| 5,690,134 A | * | 11/1997 | McCauley | 135/133 |
| 6,095,172 A | * | 8/2000 | Trapp et al. | 135/96 |

(Continued)

FOREIGN PATENT DOCUMENTS

GB            475489        11/1937

OTHER PUBLICATIONS website, "abcdistributing.com/store/0205F1/31.cfm?q=lounge%20chair%20with%20canopy&prevIndex=0&nextIndex=2&t=1&cart=", "Lounge Chair With Canopy," 2 sheets.

(Continued)

*Primary Examiner*—Laurie K. Cranmer
(74) *Attorney, Agent, or Firm*—Richard C. Litman

(57) ABSTRACT

The tent chair includes a folding frame supporting a folding cover, with the frame attached to a folding or portable chair. The chair has a single rearward frame bow which is radially flexible but rigid orthogonal to the lateral bow pivot axis of the chair. A series of similar bows is pivotally attached at or toward the front of the chair. The axially orthogonal rigid rearward bow supports the cover and prevents the forward bows from collapsing the cover forwardly as it is pulled taut. One use of the device is as a hunting blind, with a quick release optionally allowing the cover to be rapidly opened. Other configurations provide for use as a photography blind, a privacy shelter for camping or beach use, ice fishing, as a wheelchair or beach lounge chair cover, etc., and may have sufficient room for more than one person.

15 Claims, 15 Drawing Sheets

U.S. PATENT DOCUMENTS

| | | |
|---|---|---|
| 6,209,611 B1 | 4/2001 | Johnson |
| 6,296,002 B1 | 10/2001 | Tashchyan |
| 7,047,992 B1 * | 5/2006 | Fluellen .................. 135/98 |
| 2002/0078988 A1 | 6/2002 | Valpredo |
| 2002/0112752 A1 | 8/2002 | Blakney |
| 2002/0124877 A1 | 9/2002 | Dufort |
| 2003/0010371 A1 | 1/2003 | Langley |
| 2003/0066550 A1 * | 4/2003 | Al-Ghamdi ................. 135/121 |
| 2004/0129306 A1 | 7/2004 | Jefferson |
| 2004/0226597 A1 | 11/2004 | McCampbell |

OTHER PUBLICATIONS website, "bestproduct88.com/leisure/BT9101.html", "Chair Sun Shelter," one page.

* cited by examiner

TENT CHAIR

BACKGROUND OF THE INVENTION

1. Field of the Invention

The present invention relates generally to portable, collapsible shelters and the like. More specifically, the present invention comprises several embodiments of a small, folding tent or awning for one or more persons, with the tent being temporarily or permanently attached to a portable or mobile chair or seat. The present tent chair is useful as a blind for hunters or wildlife photographers, as a privacy enclosure while camping or at the beach, and/or for other purposes where a portable enclosure or shelter combined with seating means is desired or required.

2. Description of the Related Art

Tents and similar lightweight, portable enclosures have been known and used for a considerable period of time for protection from the elements. Typically, such conventional tents utilize one or more poles with a series of ropes or lines pulling the tent fabric taut outwardly from the pole(s). More recently, lightweight tents have been developed which utilize a series of omnidirectionally flexible rods to maintain the domed or other shape of the tent.

Hunters, campers, wildlife photographers, and others who enjoy the outdoors also often make use of portable, lightweight chairs and seating while in the field. This is particularly true of hunters and photographers, who have occasion to remain nearly motionless for long periods of time while awaiting the approach of game or other animals. Some form of reasonably comfortable seating is virtually essential in such an environment.

Heretofore, hunters and wildlife photographers typically carried a blind or some form of enclosure into the field, as well as a separate chair or other seating. In response to this requirement to carry two different and separate articles, a few combination chairs and enclosures or shelters have been developed. Some of these devices are directed for use by the outdoorsman, while others are directed to use by sports enthusiasts and the like to protect them from the elements while watching an event. In some instances, chair enclosures have been developed for use over strollers, wheelchairs, and similar wheeled conveyances to protect the occupant from the elements.

Most such devices tend to be relatively bulky, heavy, and/or cumbersome to erect and take down, due to their use of relatively rigid structural members and/or other complexities. Moreover, they tend not to be particularly versatile, being somewhat limited in their applications to certain specific environments of use.

Thus, a tent chair solving the aforementioned problems is desired.

SUMMARY OF THE INVENTION

The present tent chair in its various embodiments includes a cover supporting system formed of one or more rearwardly deployed bows and a plurality of forwardly deployed bows. However, a single forward bow may be used if desired, or the forward bow may be deleted for a minimalist shade or shelter. The primary rearward bow is rigidly secured to the back of the chair relative to the longitudinal or fore-aft axis of the chair when deployed, with the forward bows being pivotally secured to the chair or to a support extending from the chair. All of the bows have relatively wide but thin cross sections, enabling them to flex readily in one direction, i.e., radially inwardly and outwardly, but providing great stiffness in the orthogonal direction, i.e., resisting bending along the folding axis of the assembly. This allows the covering material to be pulled taut from the back of the chair, or from the rear bow, over the forward bows without collapsing the rear bow forwardly.

The present tent chair is adaptable to a wide variety of different environments, but is particularly well suited as a blind for hunters and wildlife photographers. The covering material may be formed of a camouflage material for such use, but may include windows and/or other openings therein for viewing, ventilation, photography, and/or shooting. A floor panel may be incorporated with the device if so desired, with the floor optionally including an opening or openable panel therein e.g., for ice fishing and the like.

In addition to the above features, the cover may include a quick opening feature wherein the cover and bows are biased to a closed position by a bungee cord, spring, or the like, with the closed position being only slightly beyond a neutral position for the mechanism. A slight upward movement of the forwardmost bow moves the bungee past its neutral point, whereupon it draws the cover rapidly upward and rearward to quickly open the assembly. This is particularly useful in a hunting blind configuration. The present tent chair may also be adapted to other types of chairs, such as wheelchairs and beach lounge chairs in various configurations.

These and other features of the present invention will become readily apparent upon further review of the following specification and drawings.

BRIEF DESCRIPTION OF THE DRAWINGS

FIG. 10A is a side elevation view of another embodiment of the present tent chair, showing a cover deployed over a reclined beach lounge chair or the like.

Similar reference characters denote corresponding features consistently throughout the attached drawings.

DETAILED DESCRIPTION OF THE PREFERRED EMBODIMENTS

The present invention comprises numerous embodiments of a portable chair having a folding cover or enclosure retractably installed therewith. The present tent chair is particularly useful as a hunting or wildlife photography blind, but may be adapted with minor modifications to a number of other uses as well, e.g., a privacy enclosure for camping or at the beach, as an ice fishing shelter, a tanning enclosure, a protective cover for a the occupant of a wheelchair, a sunshade or the like, etc.

Figure 2:
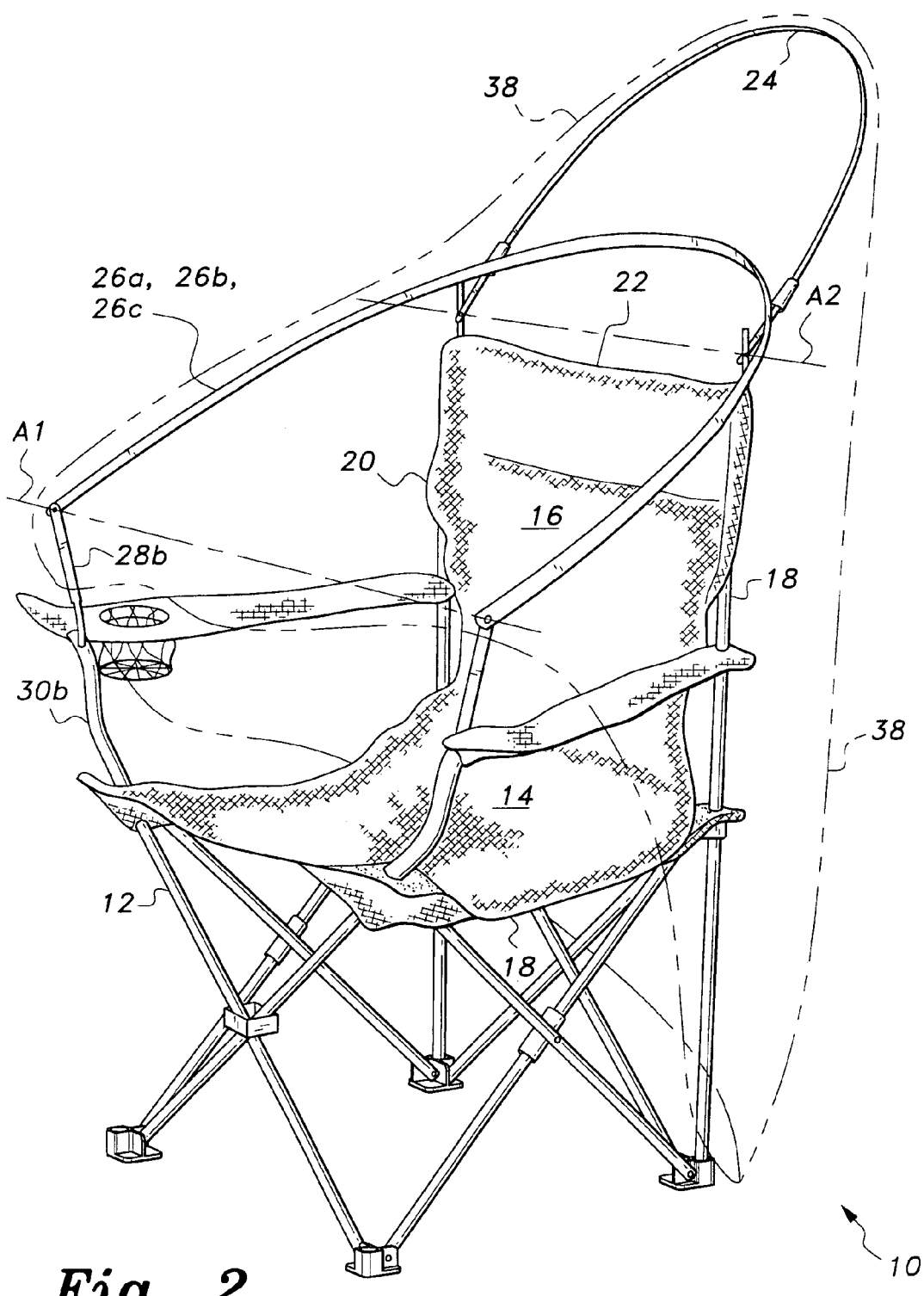
FIG. 2 is a perspective view of the tent chair of FIG. 1 showing the cover support bows partially raised or retracted, with the cover in broken lines.
Figure 3:
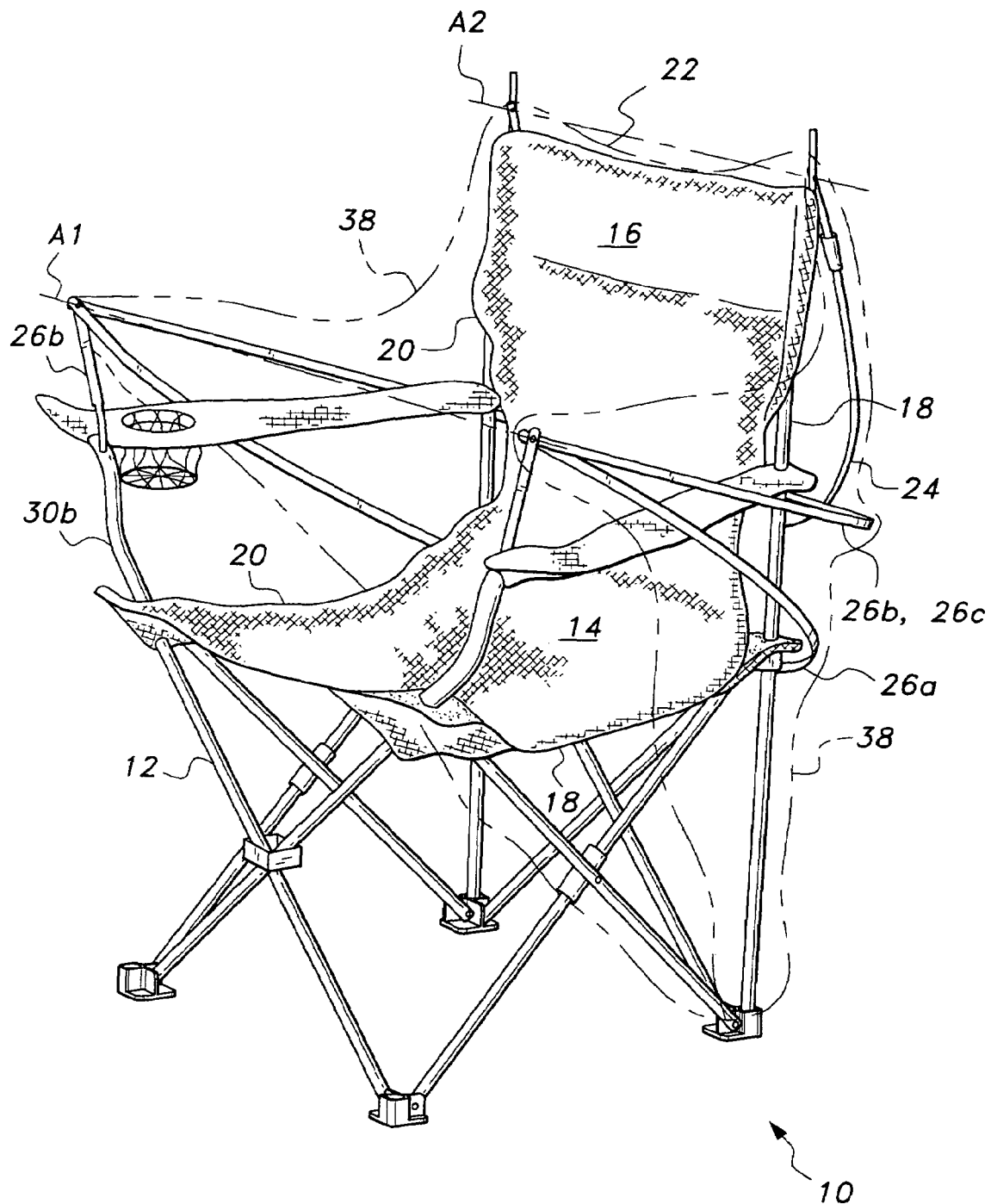
FIG. 3 is a perspective view of the tent chair of FIGS. 1 and 2 showing the cover support bows completely retracted, with the cover in broken lines.
Figure 4:
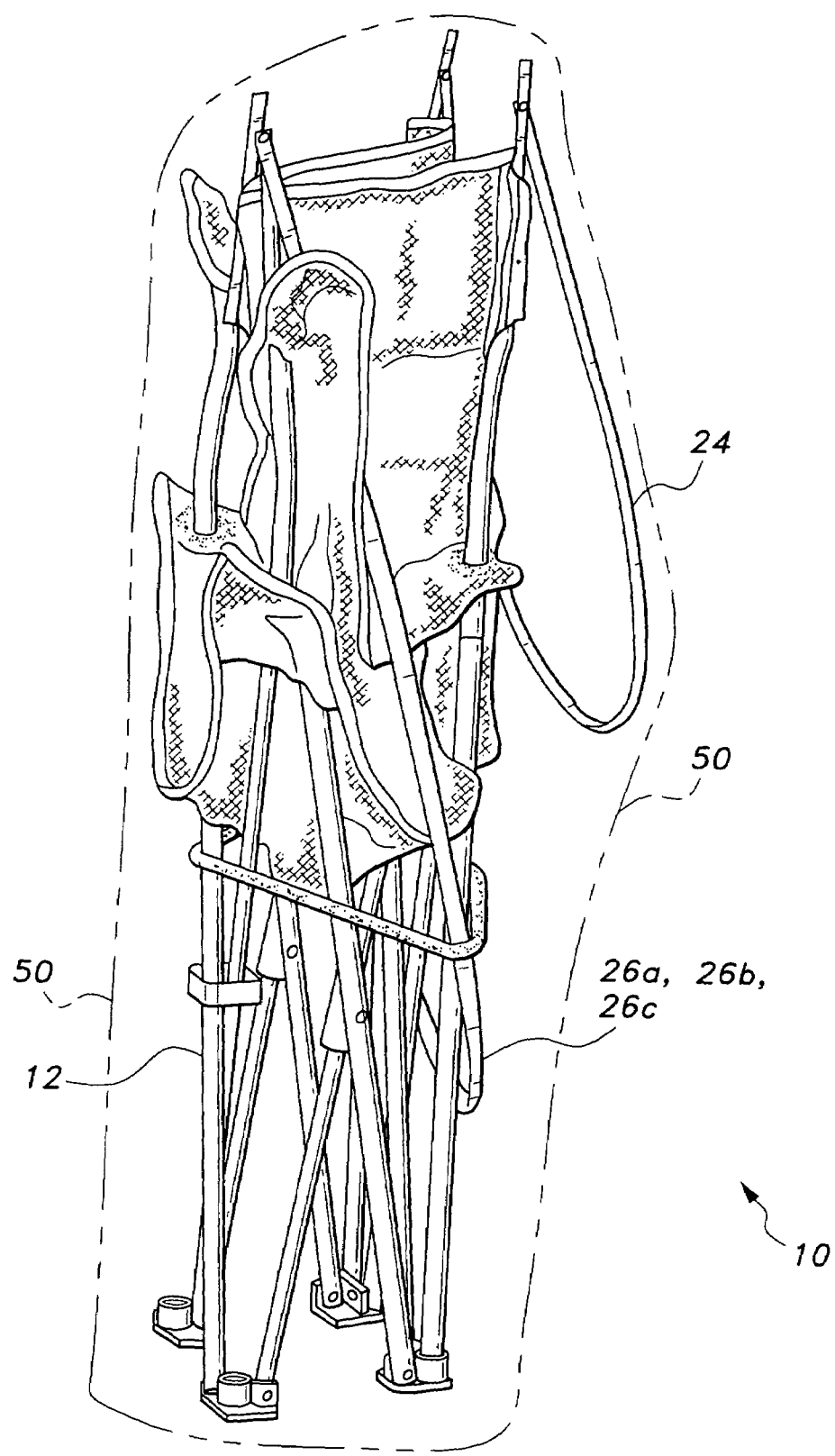
FIG. 4 is a perspective view of the tent chair of FIGS. 1 through 3 showing the cover bows completely retracted and the chair in its collapsed configuration, with a carrying and storage bag shown in broken lines.
Figure 9:
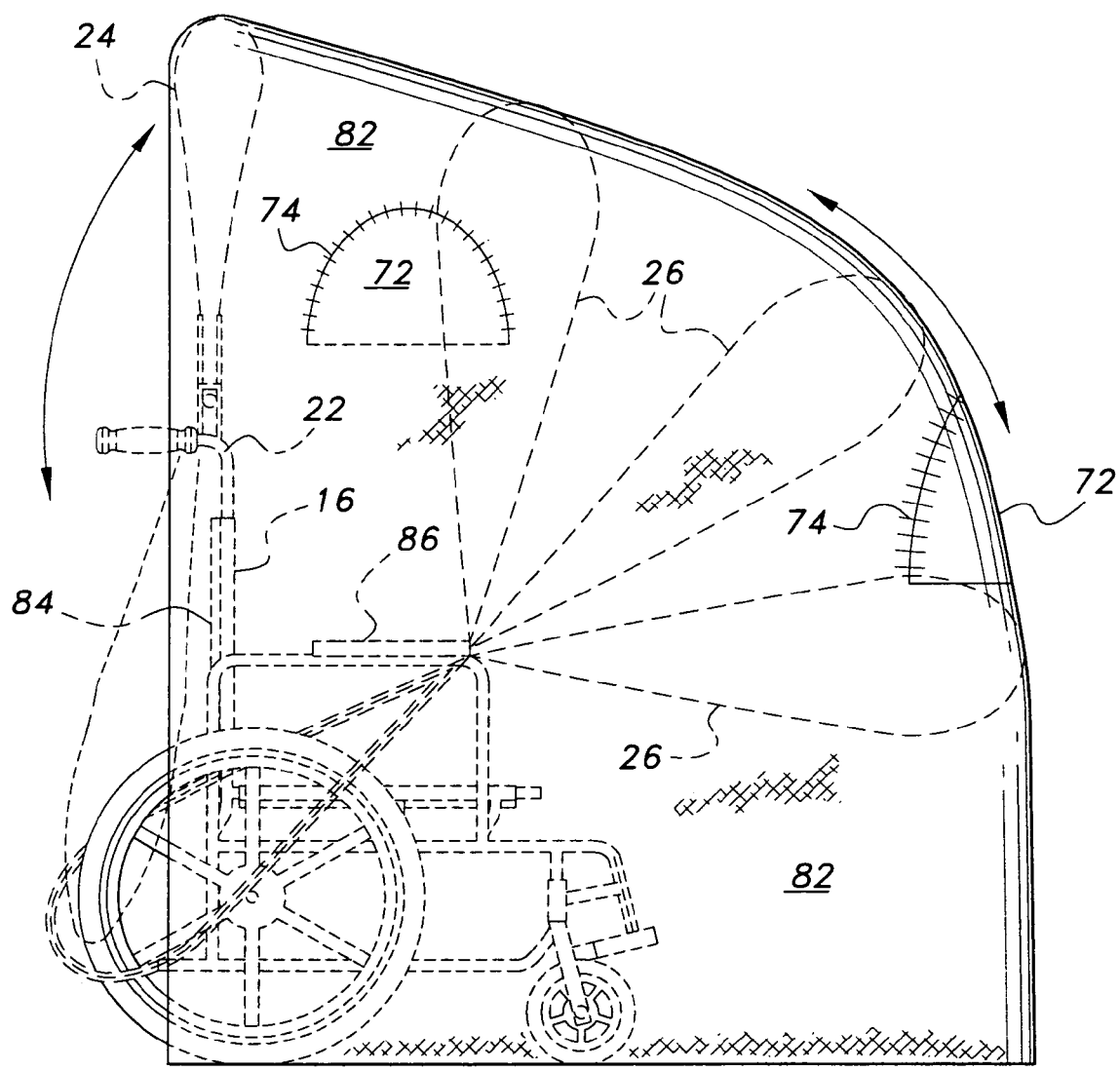
FIG. 9 is a side elevation view of an alternate embodiment of the present tent chair installed on a wheelchair.
Figure 10A:
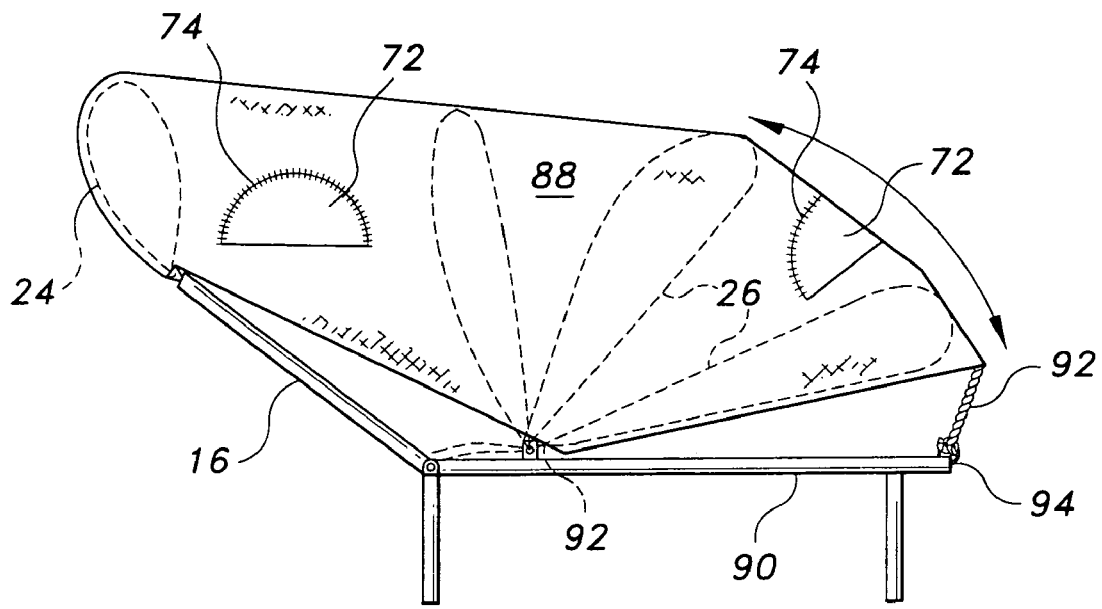
Figure 10B:
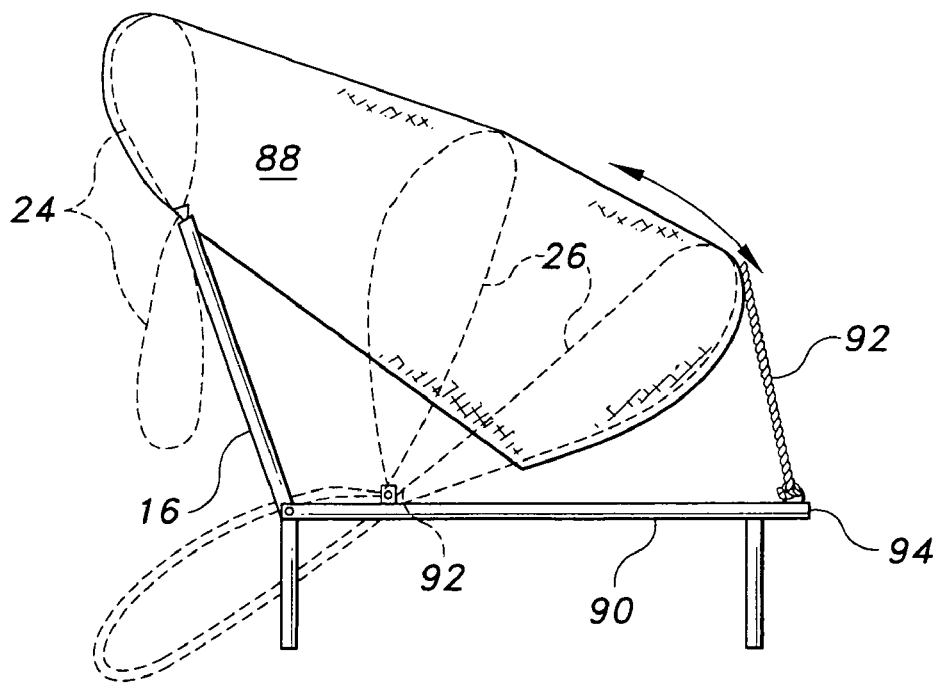
FIG. 10B is a side elevation view of the embodiment of FIG. 10A in which the backrest of the chair is raised, showing the alternative retracted configuration of the cover support bows and cover in broken lines.

FIGS. 1 through 4 illustrate the progressive steps in folding the present tent chair 10 from its fully deployed state (FIG. 1) to its fully collapsed and stored state (FIG. 4). The cover is shown in broken lines in FIGS. 1 through 4, in order to more clearly illustrate the underlying structure of the present device. The chair 12 may be any suitable type of folding or portable chair, e.g., the camp chair 12 illustrated in FIGS. 1 through 4, or other chair type, even a wheelchair or beach lounge chair as illustrated in FIGS. 9 through 10b, as desired. The camp chair 12 shown in FIGS. 1 through 4 folds more compactly than many other types of folding chairs, with the series of diagonal and vertical legs drawing together both laterally and longitudinally to form a compact parallel bundle when folded. The tent or cover portion of the present invention is well adapted for folding with such a compactly folding chair, but may be used with other chair types which fold flat or even with a non-folding chair, if so desired.

The camp chair 12 of FIGS. 1 through 4 includes a seating surface 14 with a back support 16 extending upwardly therefrom. The edges of the seating surface 14 and back support panel 16 define the left and right sides of the chair 12, respectively 18 and 20, with the back 16 having an upper edge 22 from which a portion of the tent or cover structure extends. The chair 12 includes a lateral or forward bow pivot axis A1, which passes through the two laterally disposed pivot points for the forward bows of the structure, and a lateral, rearward bow pivot axis A2 which passes generally along or immediately adjacent to the upper edge 22 of the seat back 16. The two axes A1 and A2 are parallel to one another.

Figure 1:
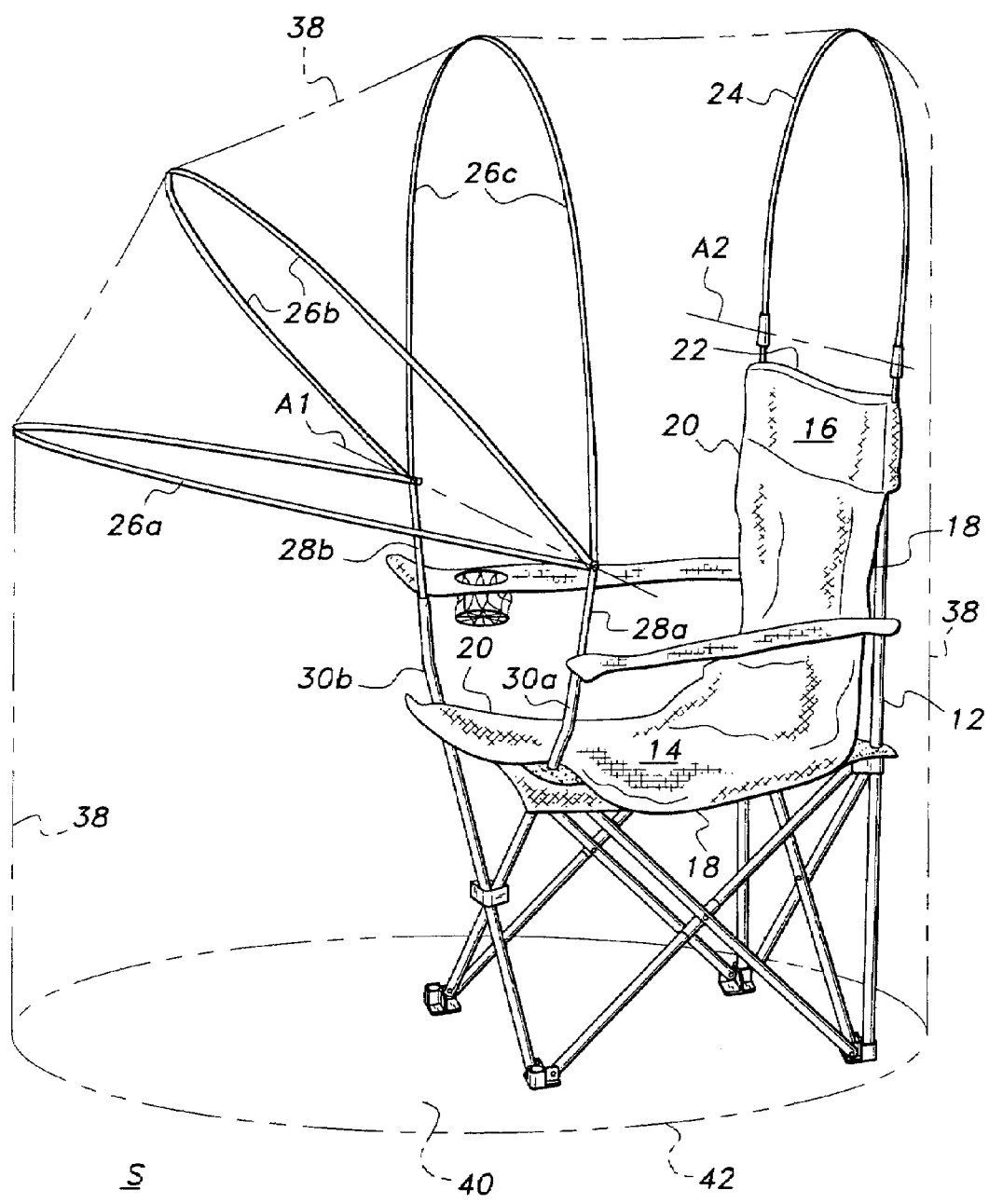
FIG. 1 is a perspective view of a tent chair according to the present invention showing the cover support bows deployed, with the cover shown in broken lines.

A single rear cover support bow 24 attaches to and extends from the upper edge 22 of the back support panel 16, from the opposite left and right sides 18 and 20 thereof. The rear bow 24 may be folded about its pivot axis A2 to compactly store the assembly, but is locked in its vertical orientation, i.e., generally coplanar with the back panel 16 as shown in FIG. 1, by a mechanism explained further below. In addition, one or more forward cover support bows, e.g., 26a, 26b, 26c, etc., extend from laterally opposed left and right side attachment points on the forward portion of the chair.

Figure 5A:
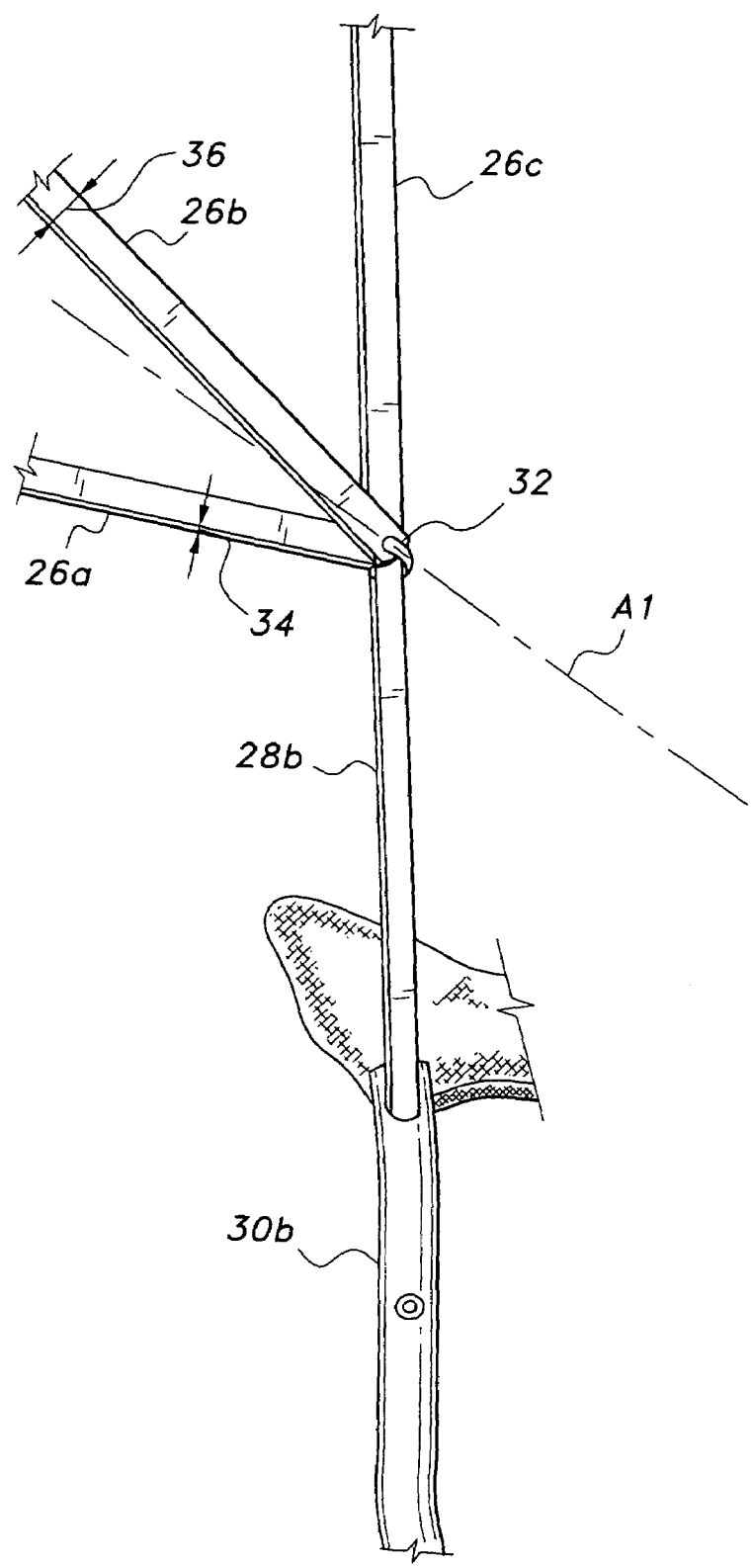
FIG. 5A is a detailed perspective view of the forward bow attachment and support structure.

In the case of the chair 12 of FIGS. 1 through 4, a relatively short forward bow support strut, respectively 28a and 28b, extends upwardly from each forward chair arm support 30a and 30b. FIG. 5A provides a detail perspective view of the right side support strut 28b, its attachment to the chair arm support 30b, and the pivot 32 attaching each of the bows 26a through 26c to the upper end of the forward bow support strut 28b. The support struts 28a, 28b may be inserted into the interiors of the respective chair arm supports 30a, 30b and riveted in place, as shown in FIG. 5A, or may be attached in any suitable manner to the interior or exterior of the arm supports, as desired. The pivots 32 securing the ends of the bows 28a, 28b, 28c to the upper ends of the support struts 28a, 28b may be rivets, bolts, pins, crimped rings passing through holes in the ends of the bows and struts, etc., as desired.

FIG. 5A also provides a detailed view of the configuration of the forward bows 26a, 26b, etc. of the present tent chair, with it being understood that the rear bow 24 has an essentially identical configuration. Each of the bows 24, 26a, 26b, etc., is formed of a thin, flat length of unidirectionally flexible material, e.g., spring steel, fiberglass or plastic, etc. The bows are relatively flexible across their narrowest dimensions 34, with their wider dimensions 36 resisting flexing thereacross. The bows 24, 26a, etc. are oriented with their wider, relatively inflexible dimension 36 orthogonal to the pivot axis A1 defined by the pivots 32, with their thinner, flexible dimension 34 allowing the bows to flex, with their ends flexing together as their respective pivot points are drawn together as the chair 12 is folded.

The chair 12 is provided with a cover 38, which extends over the spans of the bows 24, 26a, 26b, 26c, etc. (depending upon the number of forward bows provided) to conceal the chair 12 thereunder and/or conceal and protect the occupant of the chair when deployed over the extended bows. The cover 38 may be a partial cover, extending from the rear cover support bow 24 forwardly to attach to at least one of the forward bows 26a, 26b, etc. and partially down the sides of the bows and chair, e.g., the beach lounge chair of FIGS. 10a and 10b, or may be a complete cover extending downwardly to the underlying surface S to provide complete coverage, protection, and/or concealment, generally as shown in FIGS. 1 (in broken lines) and 7. Where a complete cover is provided, e.g., for use as a hunting or photography blind, ice fishing shelter, etc., a floor panel 40 may also be provided, with the floor panel 40 securing to the periphery 42 of the cover 38 by conventional means (e.g., hook and loop fastener materials, zipper, snaps, ties, etc.). The floor panel 40 may further include peripheral tiedown or stake loops for anchoring it to the underlying surface S, as desired. The floor panel 40 may comprise a continuous, unbroken span of material, or may have an opening therein for ice fishing or the like, as desired.

The cover 38 is attached to and folds with the bows 24, 26a, etc. as they are folded or pivoted relative to the chair 12. In FIG. 1, the bow configuration is shown in a fully deployed state, i.e., with the cover 38 completely concealing the chair 12 and its occupant, if any, and any other equipment beneath the cover 38. However, the assembly is quickly and easily folded for transport and storage, merely by lifting the forwardmost bow 26*a* upwardly and rearwardly about its pivot axis A1. The cover is secured to the bows 24, 26*a*, 26*b*, etc. by conventional sleeves or loops disposed about the interior of the cover, through which the bows pass. Thus, folding the forward bows upwardly and rearwardly, simultaneously draws the cover upwardly and rearwardly as well, assuming the cover 38 is not secured to a floor panel 40 or to the underlying surface S.

FIG. 2 illustrates the partially folded state of the bows and cover, with the forward bows 24*a*, 24*b*, etc. being folded rearwardly so that the central span or arc of the bows lies adjacent the upper edge 22 of the chair back 16. The forward bows 26*a*, 26*b*, etc. are free to rotate or pivot about their common pivot axis A1 at all times. However, the rearward bow 24 locks in its deployed position, as shown in FIG. 1, to prevent the tension of the cover 38 from pulling the rearward bow 24 forward as the forward bows are deployed forwardly of the chair 12. The axial locking of the rearward bow 24, along with its resistance to flexing in an orientation about its pivotal axis A2, results in the cover 38 being supported well clear of the chair 12 and its occupant when the cover and bows are deployed as in FIGS. 1 and 7.

Figure 6A:
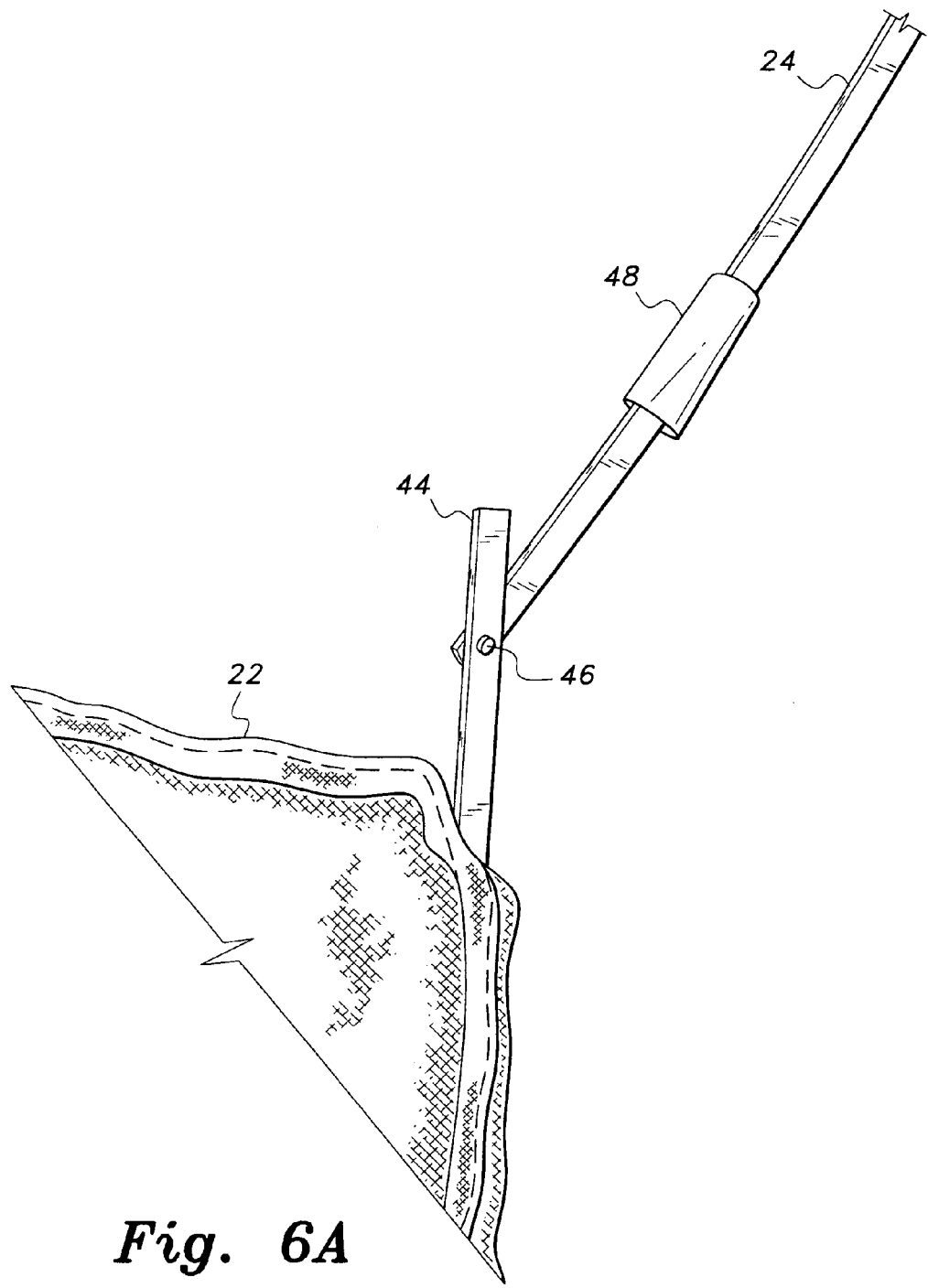
FIG. 6A is a detailed perspective view of the rear bow attachment, showing the locking mechanism in its unlocked configuration.
Figure 6B:
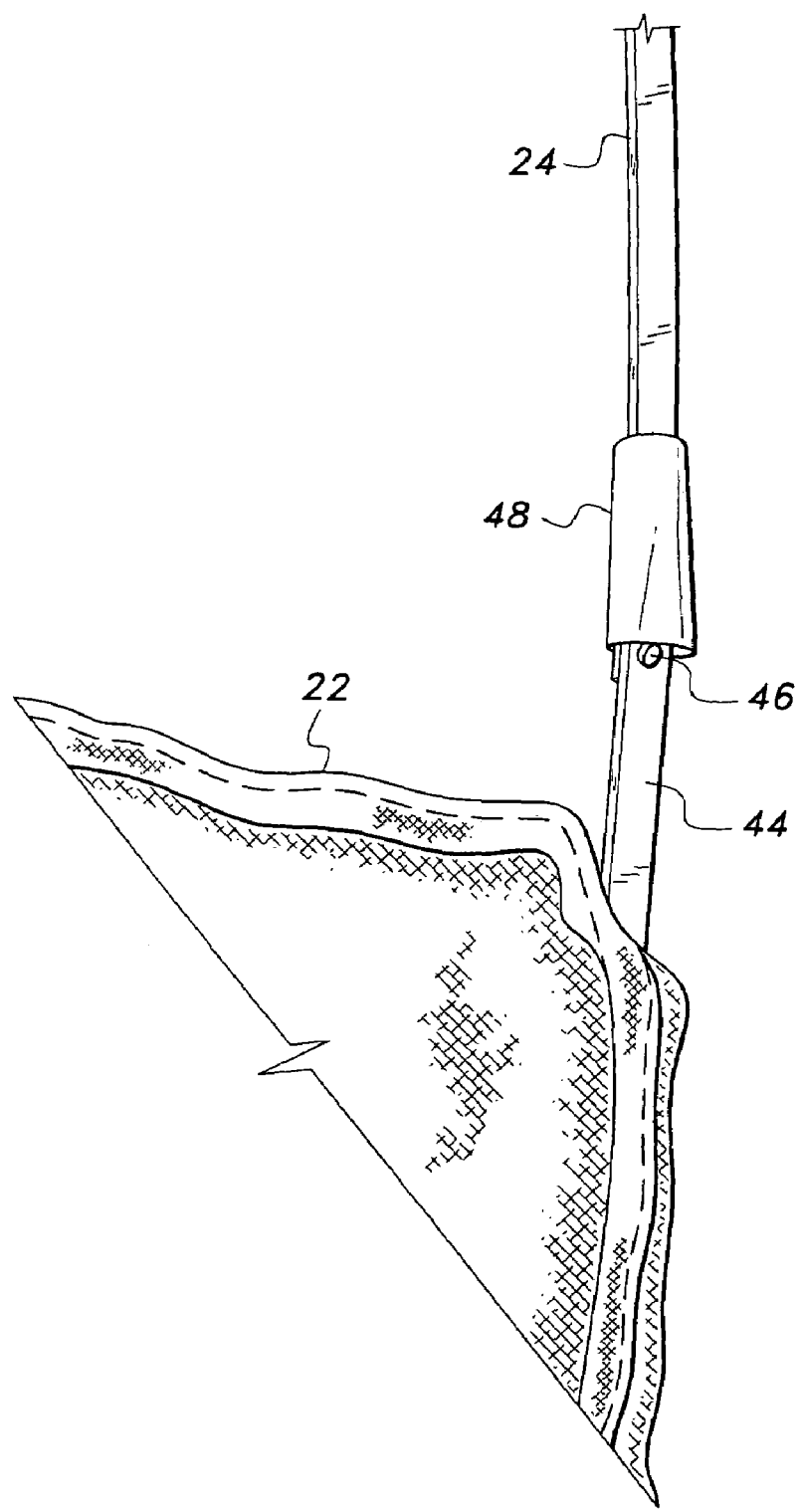
FIG. 6B is a detailed perspective view of the rear bow attachment with the rear bow raised and the locking mechanism in its locked configuration.

The locking mechanism for the rearward bow 24 is illustrated in FIGS. 6A and 6B. While only one side or end of the rearward bow 24 is shown in FIGS. 6A and 6B, it will be understood that the opposite side or end attachment is a mirror image of that shown. It will be noted that a relatively fixed extension 44 extends upwardly beyond the rear bow pivot 46. This extension 44 lies parallel and immediately adjacent to the end portion of the bow 24, which is immediately adjacent to the pivot 46. A locking sleeve 48 is installed over the rear bow 24, and slides along the bow 24. When the bow 24 is erected in its upright state with the end of the bow aligned with and adjacent to the extension 44, the locking sleeve 48 slides over the attachment or pivot end of the bow and the adjacent extension 44, to hold the bow 24 rigidly in alignment with the fixed extension 44 as shown in FIG. 6B. The rigid nature of the bow 24 across its width 36, assures that the bow 24 cannot bend or flex forwardly as the cover material 38 is pulled taut when the forward bows 26*a*, etc. are pivoted forwardly and lowered.

Folding of the rear bow 24 is accomplished by sliding the two sleeves 48 (one on each side) upwardly until they are clear of their extensions 44, thereby allowing the lower portion of the bow 24 to swivel or pivot away from the extension 44. Simultaneously, the forward bows 26*a*, 26*b*, etc. pivot or swivel upwardly and rearwardly due to their attachment to the rear bow 24 by means of the cover 38 which is attached to all of the bows 24, 26*a*, 26*b*, etc. This intermediate state, immediately after beginning to lower the rear bow 24, is shown in FIG. 2 of the drawings, with FIG. 3 illustrating the complete folding or retraction of the bows and attached cover 38 with the chair 12 remaining deployed.

The chair 12 is folded by drawing its legs together and gathering the seat and back portions 14 and 16. The lateral flexibility of the bows 24, 26*a*, 26*b*, etc. allows their ends to be drawn inwardly toward one another as their attachment points to the chair 12 are drawn closer to one another as the chair 12 is folded. The result is a relatively narrow, elongate, compact bundle, including the cover 38 which may be packed into a carrying and storage bag 50, generally as shown in FIG. 4. Deployment of the chair 12 and its attached tent is accomplished by reversing the above-described process.

Figure 5B:
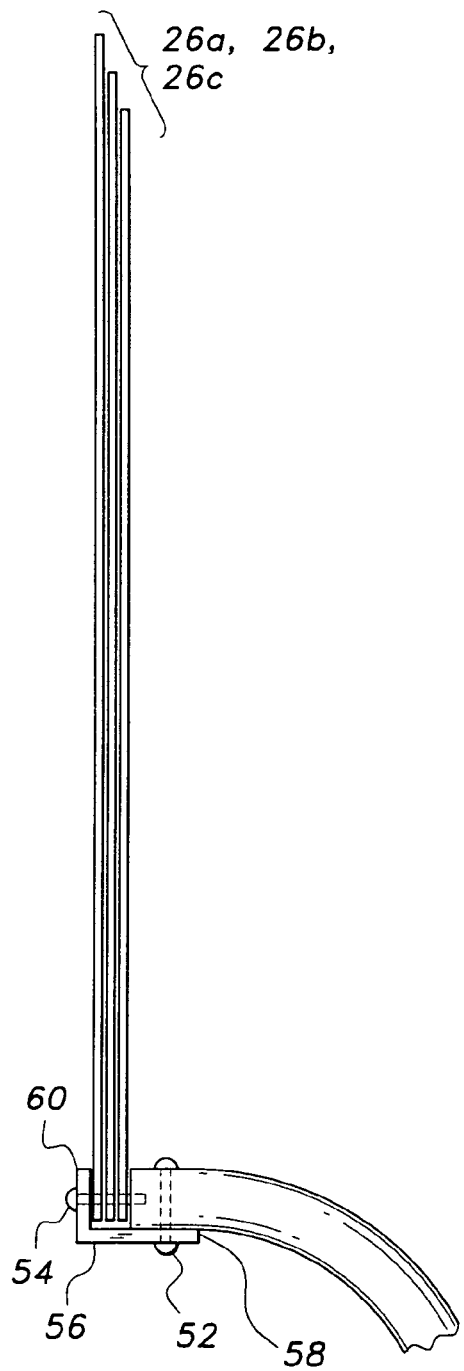
FIG. 5B is a front elevational view of an alternative bow attachment and support structure, for use depending upon the chair configuration.
Figure 5C:
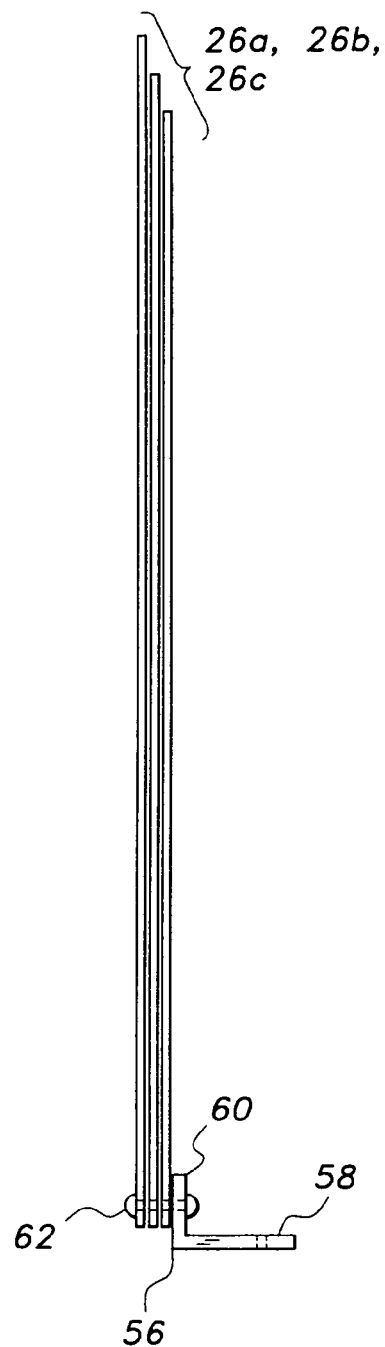
FIG. 5C is a front elevational view of another alternative bow attachment and support structure for use with yet another chair configuration.

Other types of chairs may be used with the present tent chair, as desired. FIGS. 5B and 5C provide front elevation views of an alternative front bow attachment configuration, for different chair types. In the case of FIGS. 5B and 5C, the distal or outboard end 52 of the chair armrest tube extends generally horizontally and outwardly from the remainder of the chair structure, to support an armrest thereon. As the pivot axis for the forward bow(s) 26*a* and/or 26*b*, 26*c*, etc. is laterally disposed, the pivot 54 may be affixed into or onto the outer end 52 of the armrest tube to capture the pivot ends of the bows between the head of the pivot 54 and the outer end 52 of the armrest tube.

In FIG. 5C, a detail view of the generally L-shaped bracket 56 is shown, with the base end 58 providing attachment to a generally horizontal surface (e.g., chair arm, etc.) and the upstanding distal end 60 providing for the attachment of the forward bow(s) thereto by means of a pivot 62. The bracket 56 may be attached in or on any suitable component of the chair, e.g., to the seat framework of a beach lounge chair as shown in FIGS. 10A and 10B, etc.

Figure 7:
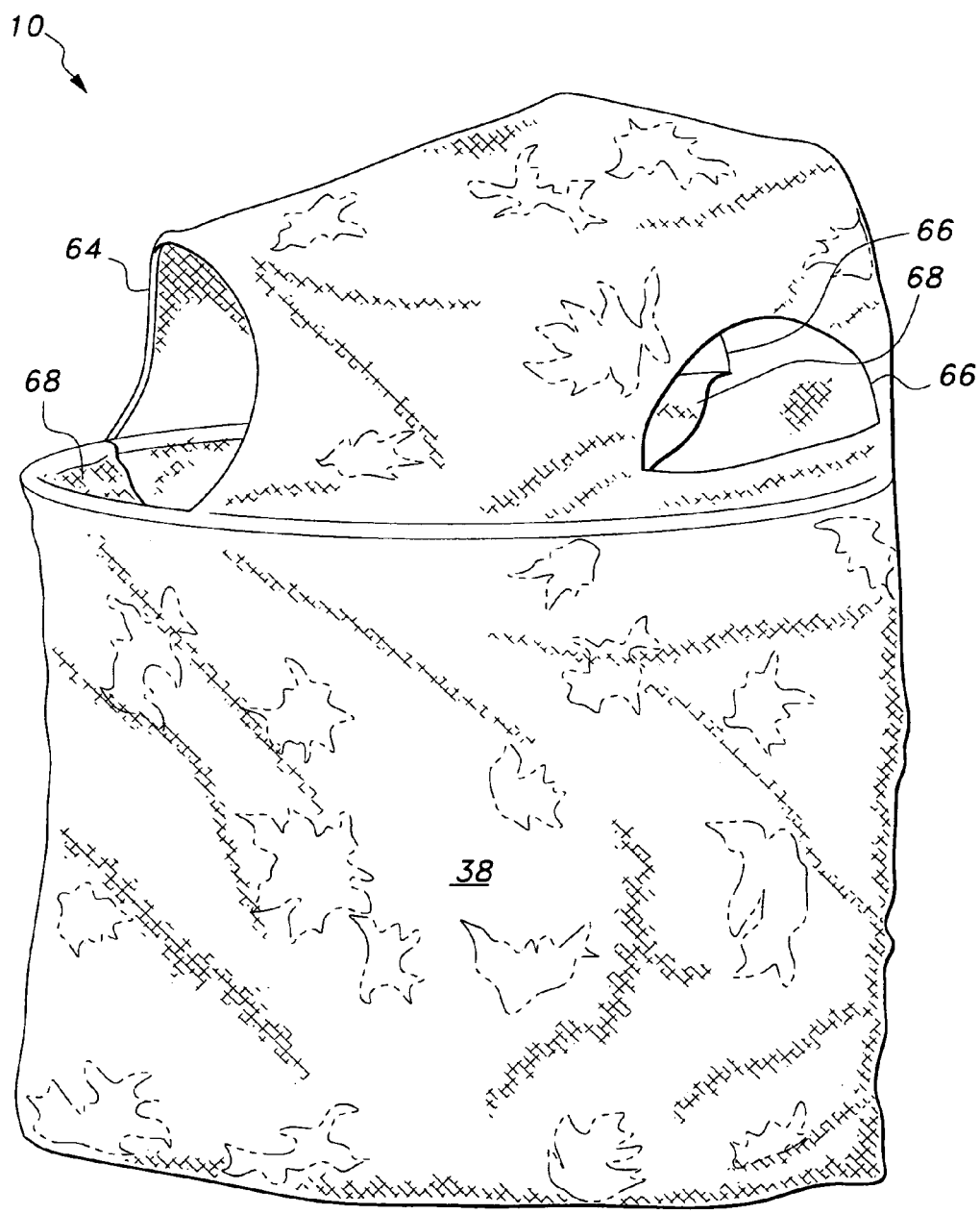
FIG. 7 is a perspective view of the tent chair embodiment of FIGS. 1 through 4 with the cover fully deployed.

FIG. 7 provides a perspective view of the erected or deployed tent chair 10, with the cover 38 disposed thereover. The cover 38 may have any of a number of different configurations, e.g., an opaque, camouflage pattern as shown in FIG. 7, or other opaque, translucent, or transparent configurations. Scent-masking and/or other scents may be applied to the device for hunting purposes, as well as loops and/or other attachment fixtures for attaching natural or synthetic camouflage materials to the exterior of the cover 38.

In some instances, a brightly colored cover having high contrast and good visibility with the surroundings may be desired, e.g., for ice fishing. Alternatively, some form of identification (externally applied signage, banner, flag, pennant, etc.) may be attached to the cover to identify one's particular tent chair, and/or to indicate loyalty to a certain team, sport, etc., as desired. A translucent or transparent cover may be desirable for beach use and/or tanning, to allow sunlight to enter the interior of the enclosure. It is not intended that the cover 38 for the present tent chair 10 in its various embodiments, be limited in color, transparency, porosity or imperviousness of materials (e.g., fabric, plastic, etc.) or other aspects, so long as it remains a thin, flexible sheet which folds with the folding of the underlying structure.

It will be noted that the cover 38 of FIG. 7 includes various openings therein. For example, the cover may include a front opening or window 64, and one or more side windows or openings 66. These windows or openings 64, 66, etc. may be provided with closure panels or flaps 68, as desired. The closure panels or flaps may comprise opaque panels to prevent light from escaping or entering, or screens to prevent the entrance of insects, etc., as desired. They may be conventionally rolled and tied within the cover 38 for storage when the windows 64, 66, etc. are opened. Other openings in the cover 38 may be provided as desired, e.g., a top opening, one or more lower openings, etc., with any and all openings being optionally provided with some form of closure as desired. Where a relatively small volume tent chair is provided, a top opening may be desirable to allow a hunter to stand to take a shot.

When opaque closures 68 are provided with an opaque cover 38, the present tent chair 10 in its various embodiments may be used as a privacy enclosure or changing room for beach or camping use, and/or may be equipped with a portable toilet or waste container and used as a restroom, if so desired. The spans and circumferences of the bows 24, 26*a*, etc., and corresponding cover 38 size, may be increased to provide additional headroom and horizontal room as required for such purposes. A larger unit may also be used as a two (or more) person blind, ice fishing shelter, etc., as desired.

Figure 8A:
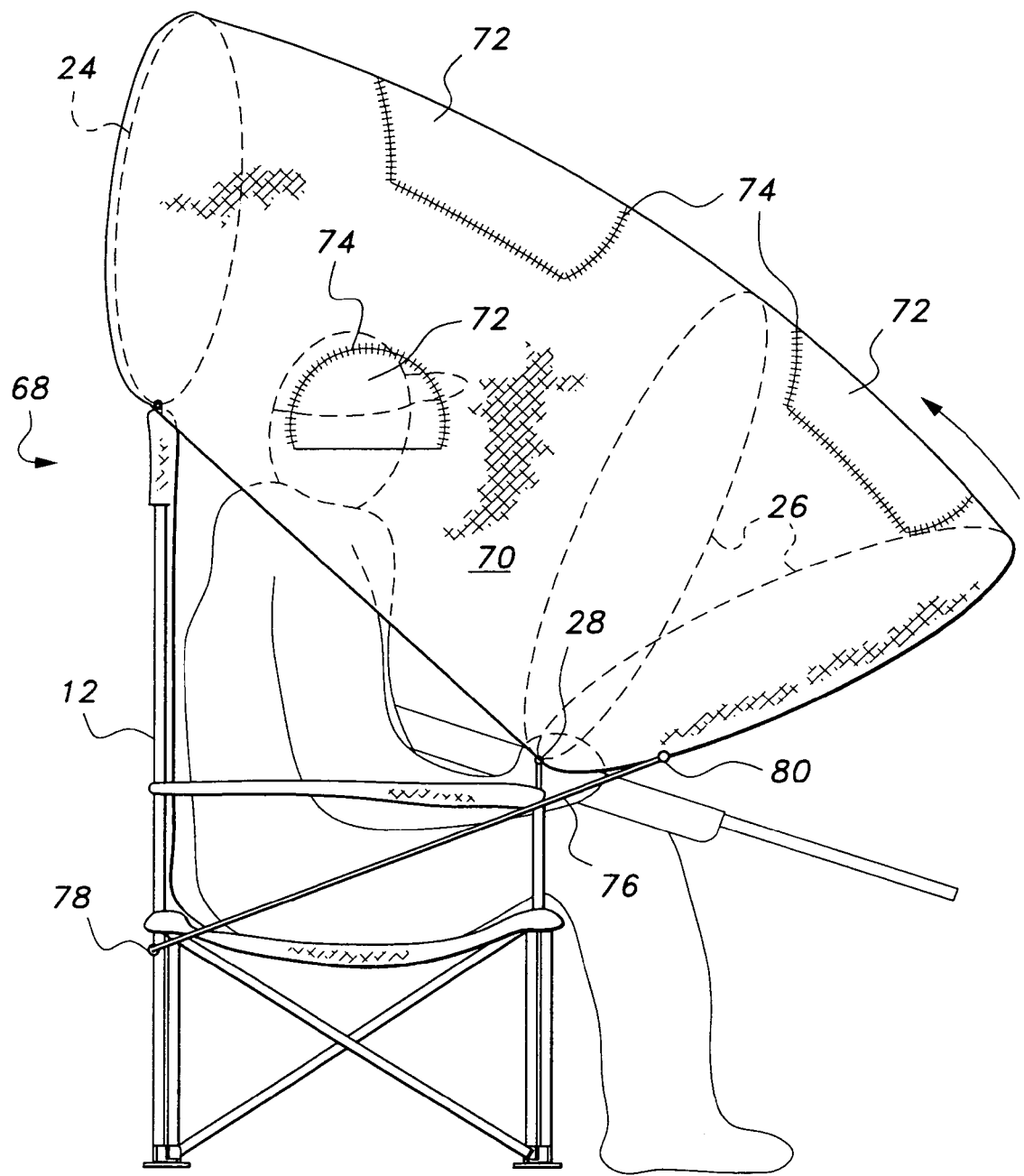
FIG. 8A is a side elevation view showing the installation of the assembly as a hunting blind showing a biasing spring urging the cover to a fully deployed or fully retracted configuration, with the cover fully deployed.
Figure 8B:
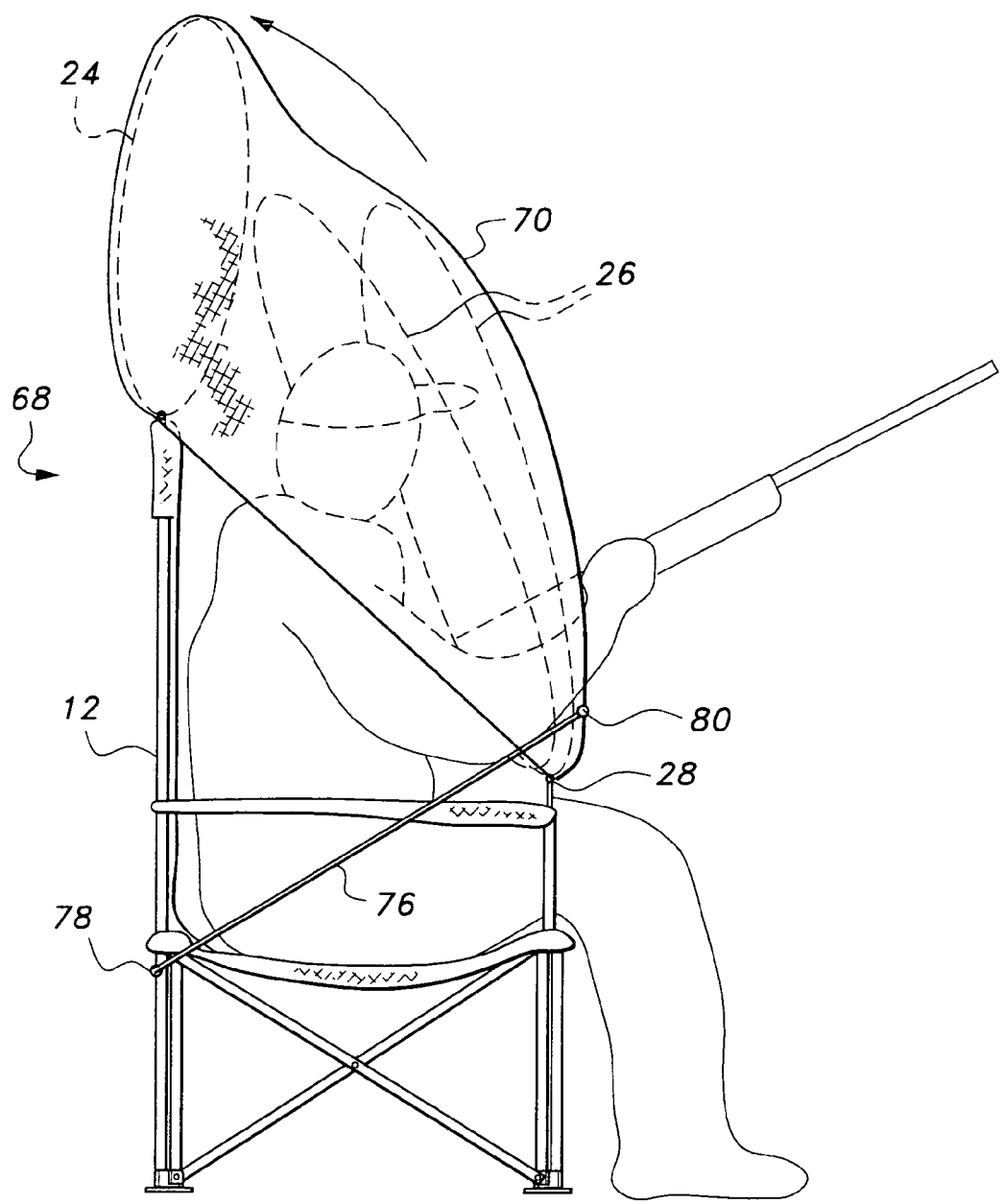
FIG. 8B is a side elevation view of the embodiment of FIG. 8A, showing the biasing spring urging the cover to its retracted configuration.

FIGS. 8A and 8B are side elevation views of yet another embodiment of the present tent chair, with the tent chair 68 of FIGS. 8A and 8B incorporating a quick-open feature. The tent chair 68 includes a relatively small, partial cover or enclosure 70, just sufficiently large as to conceal the upper body of a hunter therein. Front, side, and/or upper windows or openings 72 may be installed in the cover 70, with some means (e.g., zipper 74, etc.) for selectively securing the windows 72 in the open or closed position as desired.

The tent chair 68 of FIGS. 8A and 8B includes essentially the same structure as the tent chair 10 of FIGS. 1 through 4, i.e., a single folding rearward bow 24 which is locked in the upright position when the cover 70 is deployed, and one or more forwardly disposed bows 26 pivotally secured to laterally opposed support struts 28. In addition, at least one (and preferably two, one on each side) resilient tensile member 76 (e.g., metal spring, elastic bungee cord, etc.) extends from a chair attachment point 78 at the lower rear portion of the chair 12 to a cover attachment point 80 on the forwardmost front bow 26, somewhat above and forward of the bow's pivotal attachment point with the support strut 28.

The geometry of this arrangement results in the tensile member 76 passing below the pivot point of the forward bow attachment to the support strut, as shown in FIG. 8A, thus drawing the forward bow (and other bows) 26 generally around its pivot points and toward the rear bow 24 at the back of the chair 12. The hunter in the blind may easily tip the forwardmost bow 26 slightly upwardly, e.g., with the tip of the gun barrel or by hand, with the tension in the tensile member 76 acting to open the blind the rest of the way once the forwardmost bow 26 has been moved past its neutral position in alignment with the tensile member 76. Once the forward bow 26 is lifted so that its plane or alignment is slightly above the line of the tensile member 76, the tensile member pulls the forward bow (and other bows) 26 upwardly and rearwardly toward the rear bow 24, thus rapidly opening the blind or cover 70 to expose the hunter for a quick shot from the tent chair 68.

As noted further above, the present tent chair is not restricted to a configuration using a conventional folding chair or camp stool. FIG. 9 provides an illustration of yet another embodiment, in which a cover or enclosure 82 is provided for a wheelchair 84. In FIG. 9, a rearward cover support bow 24 extends foldably from the upper portion 22 of the seat back 16, similarly to the installation of the rear bow to corresponding structure of the folding chair 12 of FIGS. 1 through 3. A series of forwardly disposed bows 26 is pivotally attached to the forward end of each chair arm 86, and operates in essentially the same manner as that described further above for the tent chair 10 of FIGS. 1 through 3. Windows 72 and closures (e.g., zippers 74) may be provided for the occupant, as required. The cover 82 may extend to a point close to the underlying surface, as shown, or may be somewhat abbreviated, as in the blind cover 70 of FIGS. 8A and 8B. The wheelchair cover or enclosure 82 greatly improves the comfort of a wheelchair occupant in adverse weather conditions, assisting in keeping the occupant warm and dry in cold and wet weather.

FIGS. 10A and 10B illustrate an additional embodiment, in which a tent cover 88 is applied to a folding beach lounge chair 90 or the like. In FIGS. 10A and 10B, the rearward cover support bow 24 extends from its pivot points at the upper edge 22 of the chair back 16, as in the attachment of the rear bow 24 to the equivalent components of the folding chair 12 of FIGS. 1 through 3. The attachment fitting may be permanently applied to the chair back 16, or may be a clamp-on or other removable fitting, as desired. The forwardly disposed bows 26 attach to the lower portion of the chair 90 rather than to an extension from a chair arm, as in the embodiment of FIGS. 1 through 3. This is because (1) such conventional lounge chairs 90 often have no arms, and (2) the longitudinal span of the chair 90 and its cover 88 are considerably greater than in a conventional upright chair. The attachment point 92 may be a permanent component of the chair 90, or may be a bolt-on, clamp-on, or other removable fitting, e.g., similar to the bracket 56 of FIG. 5C. Windows 72 and closures 74 may be provided in the cover 88 if so desired, as indicated in FIG. 10A.

Conventional lounge chairs, e.g., the chair 90 when unequipped with the present cover 88, include adjustably positionable backs 16. It will be noted that the back 16 is angled to a considerably more upright orientation in FIG. 10B, than its relatively flat or reclined orientation in FIG. 10A. As the rearward bow 24 is rigidly attached to the back portion 16 of the lounge 90, and the cover 88 extends inelastically from the rearward bow 24 to the forwardmost of the bows 26, it will be seen that some form of adjustment may be required for the length of the cover 88 in such an embodiment. Accordingly, a forward cover support 92 may be provided, extending from the forward edge 94 of the lounge chair 90 to secure to one or more of the forward bows 26. In FIG. 10a, the support 92 is adjusted to secure the forwardmost bow 26 in a relatively closed position. However, in FIG. 10B the seat back 16 has been raised considerably, thereby allowing the entire cover 88 to shift forwardly. Accordingly, the strut or support 92 may be adjusted as desired to secure to one or more of the forward bows 26, to hold the forward portion of the cover 88 open or closed as desired. Alternatively, a shorter or shallower cover may be used and/or the attachment position of the forward bows 26 to the chair 90 may be adjusted, as desired. In any event, the forward bows 26 have a sufficient span to pivot upwardly and rearwardly to clear the chair back 16 when folded with all bows 24 and 26 and the cover 88 folding behind the chair 90 when deployment of the cover is not desired, as in the case of the other tent chair embodiments described further above.

Figure 11A:
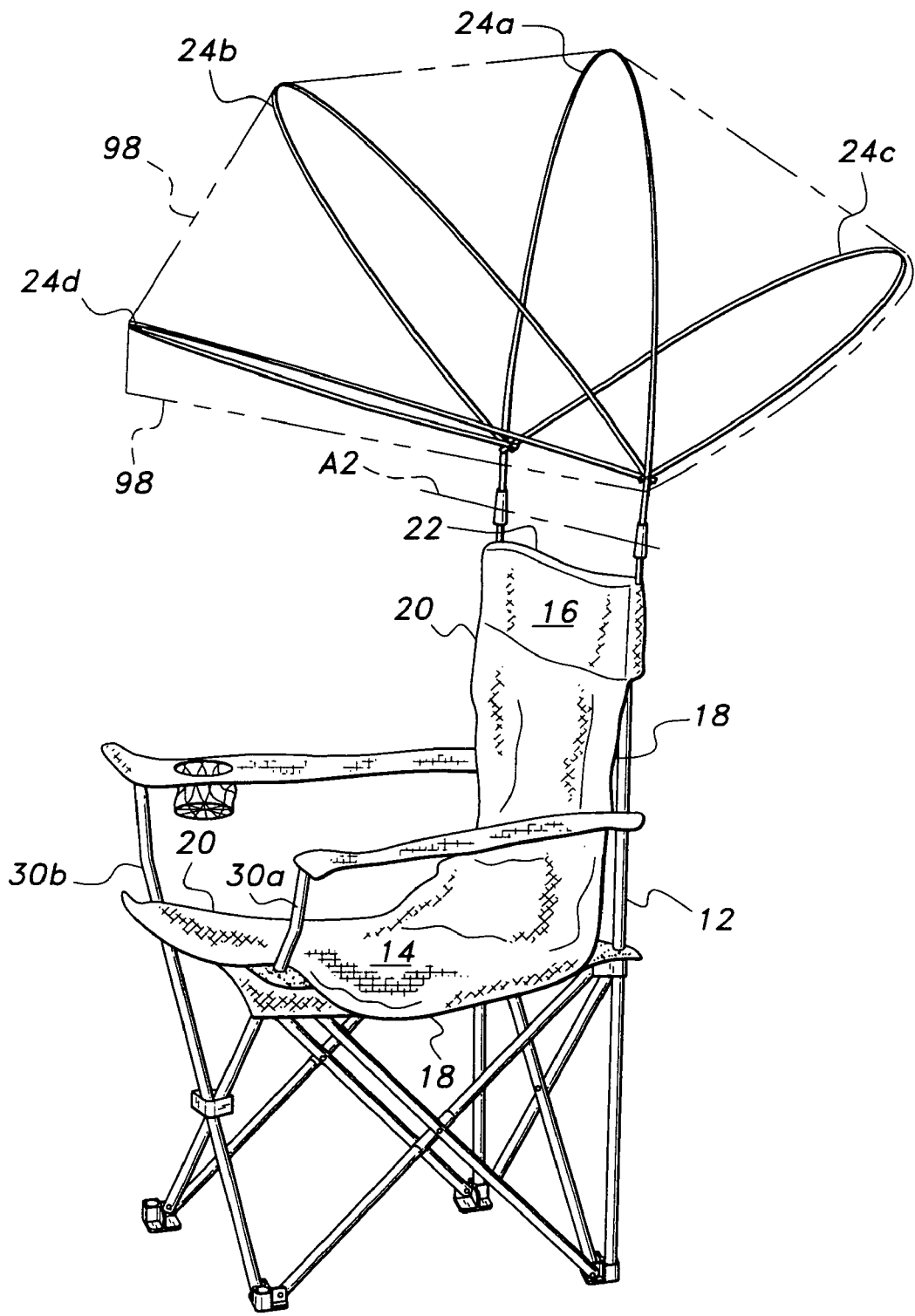
FIG. 11A is a perspective view of an alternative embodiment of the present tent chair, in which plural rear bows are provided and the forward bows deleted.
Figure 11B:
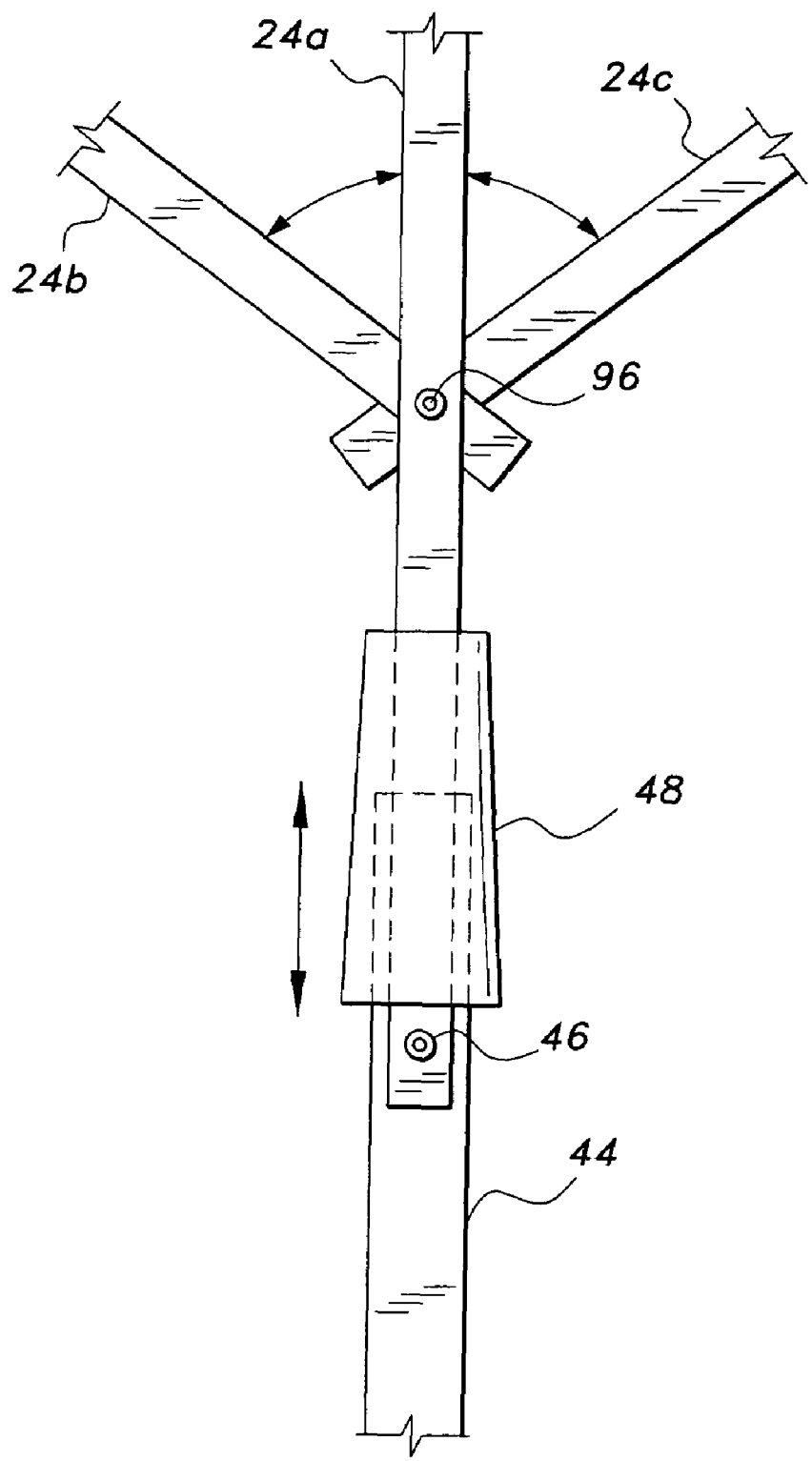
FIG. 11B is a detailed side elevation view of the plural rear bow attachment of the tent chair embodiment of FIG. 11A.

Still another embodiment of the present tent chair is illustrated in FIG. 11A, with FIG. 11B providing a detail view of the rearward bow structure of the chair of FIG. 11A. The chair 12 of FIG. 11A is essentially the same as the chair 12 of the embodiment of FIGS. 1 through 4, 8A, and 8B, having a seating surface 14 and back surface 16 extending between opposite left and right sides 18 and 20, with the back 16 having an upper edge 22. However, rather than being equipped with a single rearward bow and one or more forward bows, the chair 12 of FIG. 11A is provided with a single primary rearward bow 24a with one or more secondary bows 24b, 24c, 24d, etc. pivotally extending from the primary bow 24a. The primary bow 24a attaches to the rear bow lock extension 44 by means of a pivot 46, with a locking sleeve 48 securing the primary bow 24a in its upright position, as shown in FIGS. 6A and 6B for the single rear bow structure of the embodiment of FIGS. 1 through 4. However, the primary rear bow 24a includes a secondary bow attachment pivot 96 adjacent each end thereof, immediately above the primary bow pivot 46. The series of secondary bows 24b, 24c, etc. are pivotally attached to the primary bow 24a by this secondary bow pivot 96.

A cover 98 foldably extends over the rearward bow series 24a, 24b, etc., generally as shown in FIG. 11A when deployed. The cover 98 may be relatively abbreviated to extend from the back of the chair 12, upwardly and over the rearward bows 24a, 24b, etc., with perhaps a forwardly depending extension, as shown in broken lines in FIG. 11A. However, the cover 98 may be extended to the forward arm portion of the chair 12, if so desired, and/or one or more forwardly disposed bows (not shown in FIG. 11A, but essentially the same as shown in FIGS. 1 through 4) may be provided from the upper ends of the forward chair arm supports 30a and 30b, if so desired. The cover 98 of the tent chair embodiment of FIGS. 11A and 11B does not provide the coverage of most other embodiments of the present invention, but is well adapted to provide shade for the chair occupant at the beach or other bright, sunny location.

In conclusion, the present tent chair in its various embodiments provides a much-needed assembly of components to provide seating comfort, shelter, and/or concealment in the field in a single device. The device may be integrated with a conventional chair during manufacture or as a later installation, or may be removably attached to an existing conventional chair as desired. The versatility of the present tent chair in its various embodiments will result in a device, which will be greatly appreciated by hunters, wildlife photographers, campers, wheelchair occupants, visitors to the beach or lake, and others who have occasional need of sheltered seating in the outdoors.

It is to be understood that the present invention is not limited to the embodiments described above, but encompasses any and all embodiments within the scope of the following claims.

I claim:

1. A tent chair, comprising:
   a chair having at least a left side, a right side opposite the left side, a seating surface, and a back support with an upper edge;
   at least one rear cover support bow extending above the upper edge of said back support and laterally from the left side to the right side thereof;
   at least one forward cover support bow pivotally attached to the left side and right side of said chair and extending laterally thereacross, the forward bow pivots defining a lateral bow pivot axis;
   a cover extending from at least said at least one rear cover support bow and over said at least one forward cover support bow, secured to and completely covering each said bow; and
   at least one resilient tensile member extending from said chair to said at least one forward cover support bow and urging said at least one forward cover support bow pivotally toward said at least one rear cover support bow when said at least one forward cover support bow is moved to either side of a neutral position.

2. The tent chair according to claim 1, wherein each said cover support bow comprises a thin, flat length of unidirectionally flexible material oriented to flex radially planar to the lateral bow pivot axis of said chair while remaining rigid orthogonal to the lateral bow pivot axis.

3. The tent chair according to claim 1, wherein:
   said at least one rear cover support bow comprises a single bow selectively deployed above the upper edge of said back support, and rigidly and immovably attached thereto when deployed; and
   said at least one forward cover support bow comprises a plurality of bows.

4. The tent chair according to claim 1, wherein said cover has at least one opening therein, said cover further including a closure selectively installed over the opening.

5. The tent chair according to claim 1, wherein said cover has a lower periphery lying closely adjacent the underlying surface of said chair when said cover is deployed and extends to completely conceal said chair.

6. The tent chair according to claim 5, further including a floor extending beneath said chair and spanning said lower periphery of said cover.

7. A tent chair, comprising:
   a chair having at least a left side, a right side opposite the left side, a seating surface, and a back support with an upper edge;
   a single, selectively deployed rear cover support bow extending above the upper edge of said back support, laterally from the left side to the right side of said back support and rigidly and immovably attached to said back support when deployed;
   a plurality of forward cover support bows pivotally attached by forward bow pivots to the left side and right side of said chair, and extending laterally thereacross, the forward bow pivots defining at least one lateral bow pivot axis; and
   a cover extending from at least said rear cover support bow and over each of said forward cover support bows, secured to and completely covering each of said bows;
   wherein said rear cover support bow is movably attached when not deployed.

8. The tent chair according to claim 7, wherein each said cover support bow comprises a thin, flat length of unidirectionally flexible material oriented to flex radially planar to the lateral bow pivot axis of said chair while remaining rigid orthogonal to the lateral bow pivot axis.

9. The tent chair according to claim 7, further including at least one resilient tensile member extending from said chair to a forwardmost of said forward cover support bows and urging the forwardmost of said forward cover support bows pivotally toward said rear cover support bow when said forwardmost of said forward cover support bows is moved to either side of a neutral position.

10. The tent chair according to claim 7, wherein said cover further includes at least one opening therein.

11. The tent chair according to claim 10, wherein said opening further includes a closure selectively installed thereover.

12. The tent chair according to claim 7, wherein said cover further includes a lower periphery lying closely adjacent the underlying surface of said chair when said cover is deployed, and extends to completely conceal said chair.

13. A tent chair, comprising:
    a chair having at least a left side, a right side opposite the left side, a seating surface, and a back support with an upper edge;
    a single, selectively deployed rear cover support bow extending above the upper edge of said back support, laterally from the left side to the right side of said back support and rigidly and immovably attached to said back support when deployed;
    a plurality of forward cover support bows pivotally attached by forward bow pivots to the left side and right side of said chair, and extending laterally thereacross, the forward bow pivots defining at least one lateral bow pivot axis;
    a cover extending from at least said rear cover support bow and over each of said forward cover support bows, secured to and completely covering each of said bows; and
    a locking mechanism for maintaining said rear cover support bow in rigid and immovable attachment when said locking mechanism is activated and for allowing said rear cover support bow to be movably attached when said locking mechanism is inactivated.

14. The tent chair according to claim 13, wherein said locking mechanism comprises a right sleeve and a left sleeve, each said sleeve movable along said rear cover support bow and slidingly movable to lock said rear cover support bow in alignment with a portion of said chair.

15. A tent chair, comprising:
a chair having at least a left side, a right side opposite the left side, a seating surface, and a back support with an upper edge;
a single, selectively deployed rear cover support bow pivotally attached by a left rear bow pivot and a right rear bow pivot to the left side and right side of said chair, respectively;
a plurality of forward cover support bows pivotally attached by forward bow pivots to the left side and right side of said chair, and extending laterally thereacross, the forward bow pivots defining at least one lateral bow pivot axis; and
a cover extending from at least said rear cover support bow and over each of said forward cover support bows, secured to and completely covering each of said bows;
a left extension and a right extension fixed to said chair and extending above said left rear bow pivot and said right rear bow pivot, respectively, and parallel to the rear cover support bow when said chair is deployed;
a left sleeve and a right sleeve, each said sleeve movable along said rear cover support bow;
wherein said left sleeve and said right sleeve can be moved over said left extension and said right extension, respectively to maintain said rear cover support bow parallel with each said extension when said rear cover support bow is deployed, and said left sleeve and said right sleeve can be moved away from said left extension and said right extension, respectively so that said rear support bow can be pivoted for storage of said tent chair.

* * * * *